United States Patent [19]
Yoshida et al.

[11] Patent Number: 5,946,516
[45] Date of Patent: Aug. 31, 1999

[54] ATTACHMENT STRUCTURE FOR ATTACHING A LENS UNIT FOR A CAMERA BODY

[75] Inventors: Shigeru Yoshida; Syunichiro Ouchi, both of Omiya, Japan

[73] Assignee: Fuji Photo Optical Co., Ltd., Omiya, Japan

[21] Appl. No.: 08/988,083

[22] Filed: Dec. 10, 1997

[30] Foreign Application Priority Data

Dec. 10, 1996 [JP] Japan ................................. 8-329311
Dec. 10, 1996 [JP] Japan ................................. 8-329630

[51] Int. Cl.$^6$ ................... G02B 17/02; G03B 17/00; F16H 55/14
[52] U.S. Cl. ................... 396/529; 359/827; 359/830; 74/461
[58] Field of Search .................. 396/439, 529, 396/531, 533; 359/827–830; 74/461

[56] References Cited

U.S. PATENT DOCUMENTS

| | | | |
|---|---|---|---|
| 3,926,067 | 12/1975 | Blanchard et al. | 74/461 |
| 5,130,851 | 7/1992 | Shirie | 359/700 |
| 5,416,549 | 5/1995 | Katsuyama et al. | 359/811 X |
| 5,455,715 | 10/1995 | Okubo | 359/827 |
| 5,572,272 | 11/1996 | Zander et al. | 396/513 |

*Primary Examiner*—Safet Metjahic
*Assistant Examiner*—J. K. Han
*Attorney, Agent, or Firm*—Sixbey, Friedman, Leedom & Ferguson; David S. Safran

[57] ABSTRACT

An interlock ring is provided to transmit a rotational force of a casing of a lens unit to a attachment ring, and contact faces of a projection of the attachment ring and a projection of the interlock ring are slant. Thereby, the stress is prevented from concentrating at the base corners of the projections. Thus, the projections can be prevented from breaking due to over-fastening.

11 Claims, 9 Drawing Sheets

F I G. 1
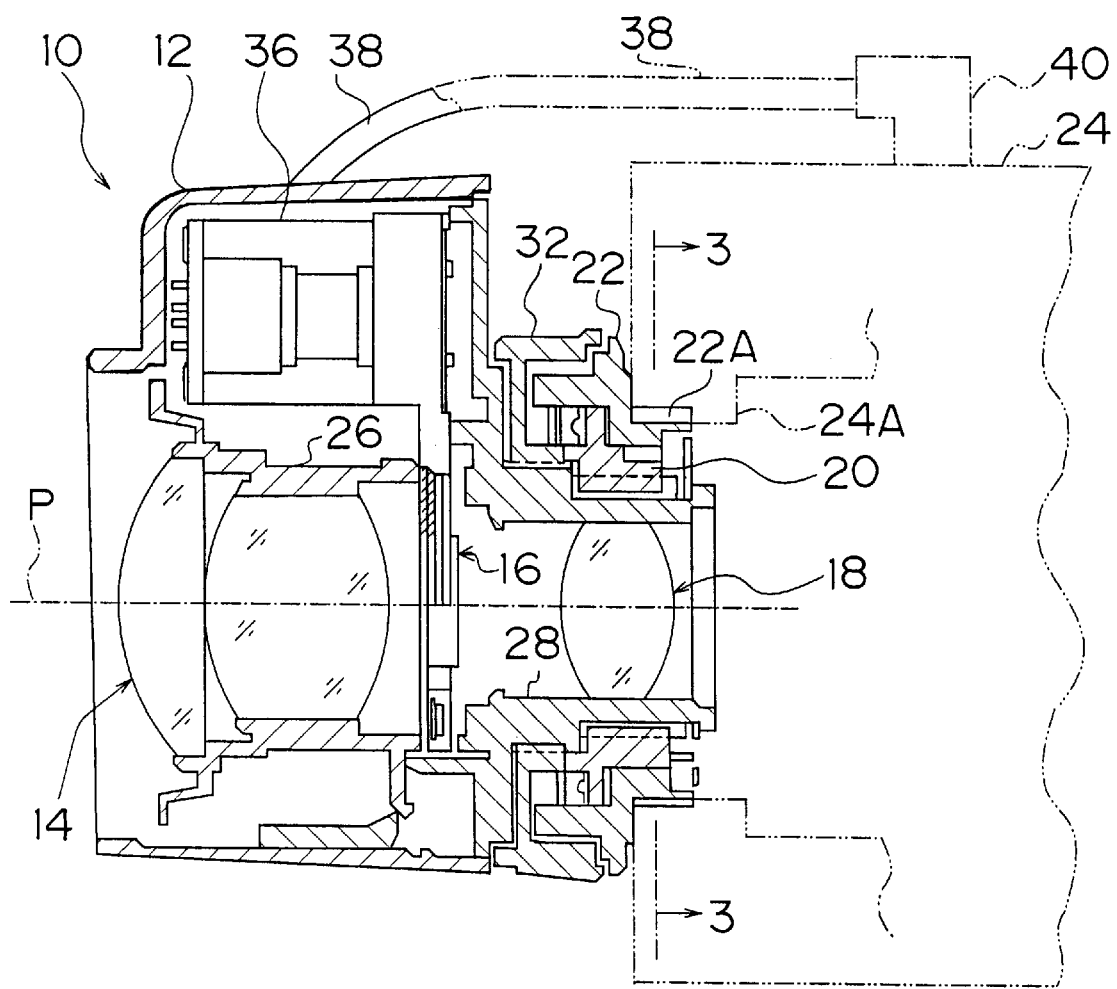

F I G. 2
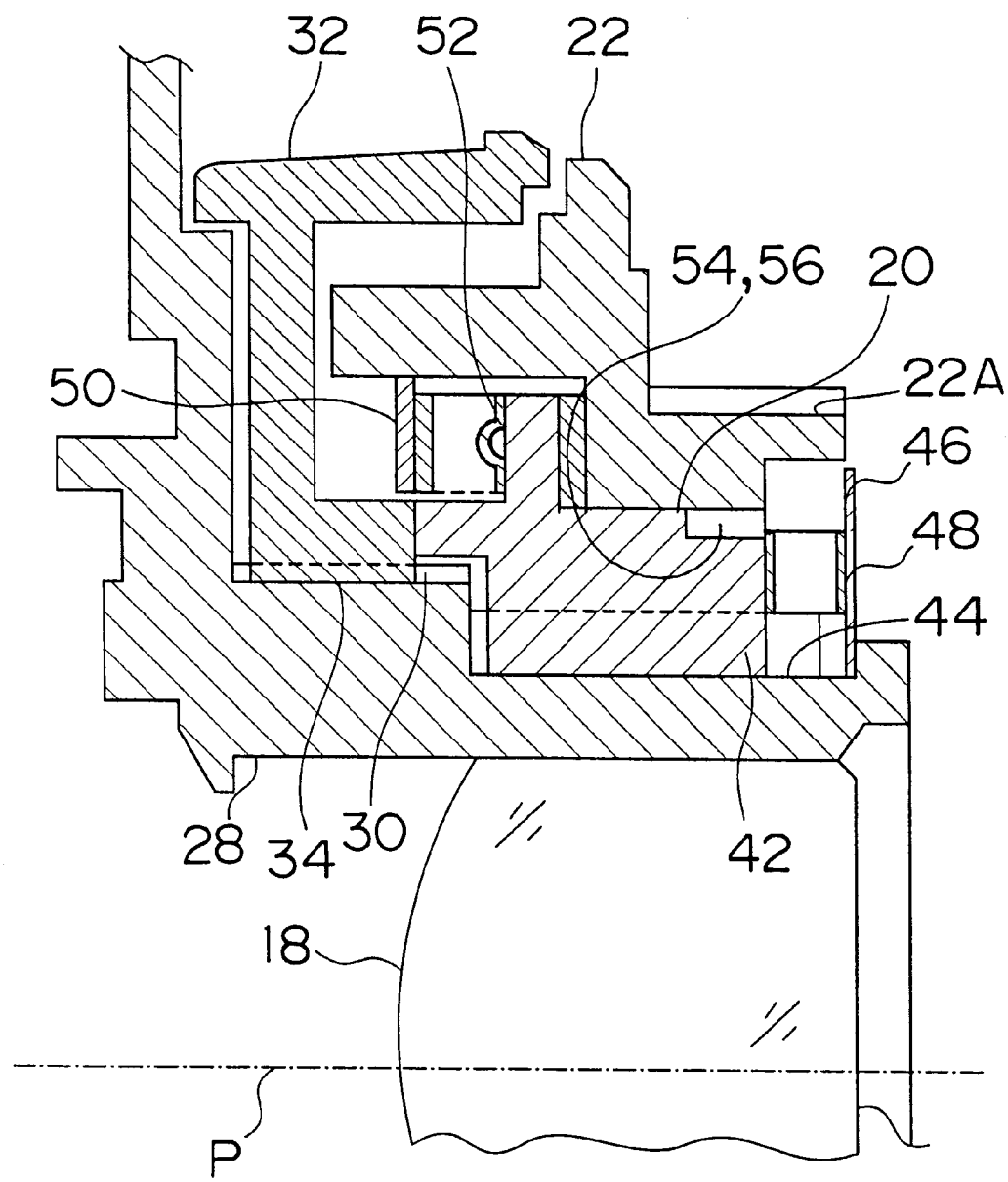

ATTACHMENT STRUCTURE FOR ATTACHING A LENS UNIT FOR A CAMERA BODY

BACKGROUND OF THE INVENTION

1. Field of the Invention

The present invention relates to an attachment structure of a lens unit, and more particularly to an attachment structure of a CCTV lens unit for attaching the lens unit to a CCTV camera.

2. Description of Related Art

In a closed-circuit television (CCTV) lens unit of a CCTV camera, a taking lens is mounted in a casing of the lens unit, and the casing is provided with an attachment ring for attaching the lens unit to a camera body by engaging in the camera body. The lens unit includes an iris unit comprising an iris and an iris meter. The iris unit is supplied with electricity from the camera body via a cable of the iris meter connecting with a connector of the camera body.

The casing and the attachment ring of the lens unit connect via projections. When the casing is rotated in a fastening direction to attach the lens unit to the camera body, the rotational force of the casing is transmitted to the attachment ring through the projections, so that the attachment ring is rotated and engaged to the camera body. After fastening the attachment ring, the casing is rotated in an opposite direction (i.e. a loosening direction) within a rotational angle limit so as to adjust the position of the cable to easily connect with the connector. If the casing is rotated in the loosening direction more than the rotational angle limit, the projections come in contact with one another and the attachment ring is rotated and loosened.

In the conventional lens unit, contact faces of the projections of the casing and the attachment ring are parallel with the radial direction of the attachment ring, and stress may concentrate at base corners of the projections as a result. Thus, if an excessive rotational force is transmitted from the casing to the attachment ring, that is, if the attachment ring is over-fastened after fastening the attachment ring, there is a disadvantage in that the projections are broken. Such a disadvantage can be overcome by strengthening the projections by enlarging them; however, if the projections are enlarged, the rotational range of the casing to adjust the position of the cable is seriously narrowed.

SUMMARY OF THE INVENTION

The present invention has been developed in view of the above-described circumstances, and has as its object to provide an attachment structure of the lens unit, in which the projections are prevented from breaking due to over-fastening and the rotational range of the casing to adjust the position of the cable can be wide.

To achieve the above-described objects, an attachment structure for attaching a lens unit to a camera body of the present invention comprises: a casing of said lens unit holding a lens support member supporting a taking lens; an attaching member with a threaded part for attaching said casing to the camera body by engaging to a threaded part of the camera body, said attaching member being provided with a projection having a face slanting with respect to a radial direction of said threaded part of said attaching member; and an interlock member for transmitting a rotational force of said casing to said attaching member, said interlock member being provided with a projection having a face slanting with respect to the radial direction of said threaded part of said attaching member, said face of said projection of said interlock member being in contact with said face of said projection of said attaching member when the rotational force is transmitted through said projections.

According to the present invention, when the casing rotates in the attaching direction, the rotational force of the casing is transmitted to the interlock member. Then, the rotational force of the interlock member is transmitted to the attaching member through the contact of the slant faces of the projections. Thereby, the attaching member is rotated and engaged to the camera body. If an excessive rotational force is transmitted from the casing to the attaching member via the interlock member on completion of the fastening the attaching member to the camera body, the force is decomposed into a force in the direction along the slant faces of the projections and a force in the direction perpendicular to the slant faces. Thus, the stress concentration does not occur at the base corners of the projections. Therefore, the present invention can prevent the projections from breaking due to over-fastening, even if the projections are small.

On the other hand, to adjust the position of the cable, the casing may be rotated in a detaching direction in a proper amount after fastening the attaching member. The rotational force of the casing in the loosening direction is not transmitted to the attaching member. Since the projections can be small, the rotational range of the casing to adjust the position of the cable can be wide.

According to the present invention, the projections are formed at the positions where the lens support member is located inside and the threaded part of the camera body is located outside when the lens unit is attached to the camera body. The excessive rotational force is decomposed by the slant faces of the projections into the force to stretch the attaching member in a radial direction and the force to compress the interlock member in a radial direction; but warp of the attaching member is prevented by the threaded part of the camera body, and warp of the interlock member is prevented by the lens support member. Thus, strength of the interlock member and the attaching member improves. Therefore, the present invention can also prevent breaking the interlock member and the attaching member due to over-fastening.

According to the invention, when the casing is rotated in the attaching direction, the rotational force of the casing is transmitted to the interlock member. Then, the rotational force of the interlock member is transmitted to the attaching member by contact of the slant faces of the projections. Thereby the attaching member is rotated and fastened to the camera body. If an excessive rotational force is transmitted from the casing to the attaching member via the interlock member, one of the projections, elastically supported, is pushed by the slant face of the other projection, and is retracted from the contact position with the other projection. Thereby, the present invention can prevent breaking the projections due to over-fastening.

On the other hand, to adjust the position of the cable, the casing may be rotated in the attaching direction after fastening the attaching member. The rotational force of the casing is not transmitted to the attaching member, so that the rotation range of the casing can be extensive.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a section view showing a CCTV lens unit to which the first embodiment for an attachment structure of a lens unit of the present invention is applied;

FIG. 2 is a section view illustrating an essential part of the lens unit shown in FIG. 1;

DETAILED DESCRIPTION OF THE PREFERRED EMBODIMENTS

Figure 3:
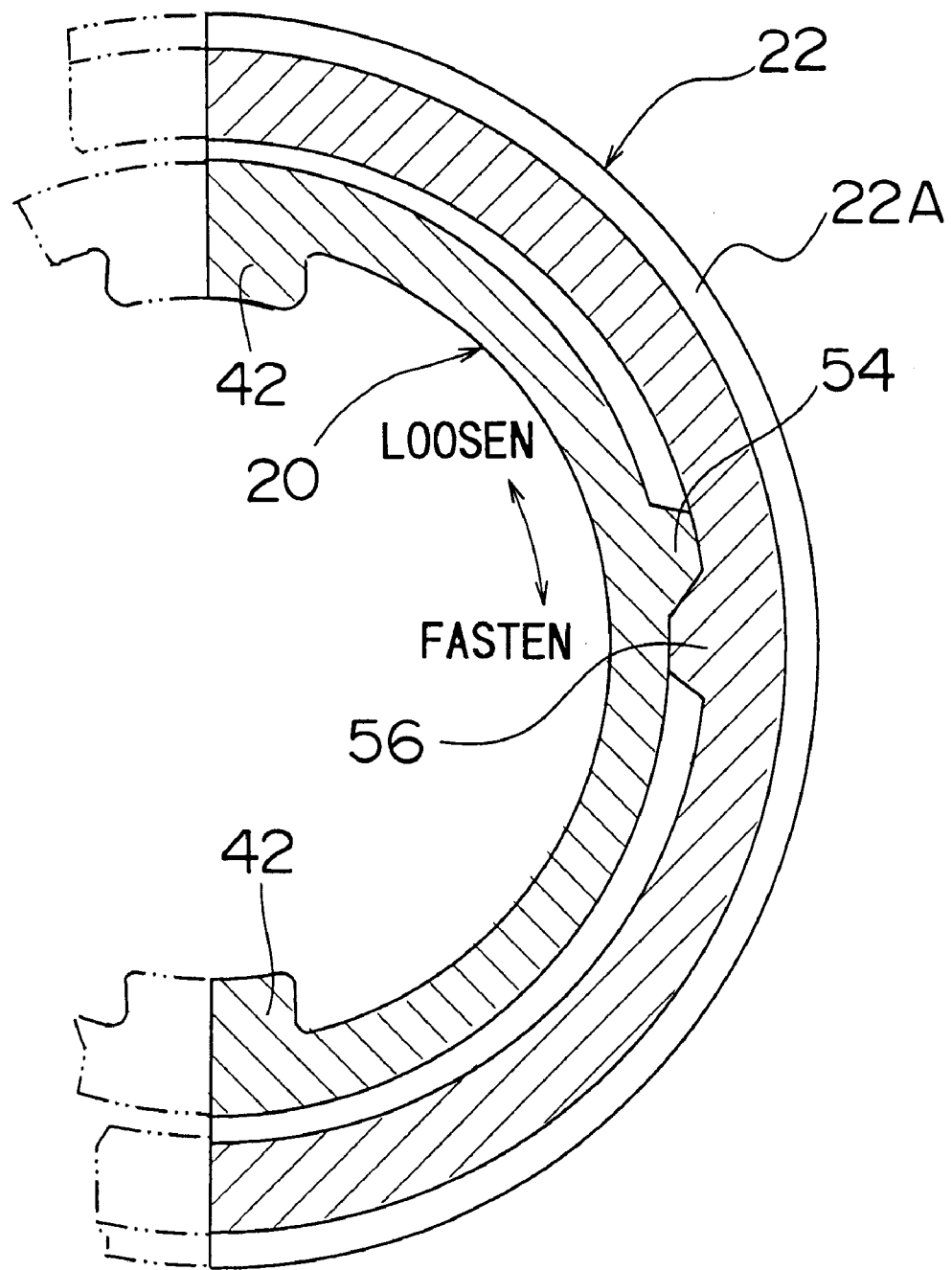
FIG. 3 is a semi-section view of an interlock ring and an attachment ring taken along line 3—3 in FIG. 1.

Detailed description will hereunder be given of the preferred embodiments of the attachment structure of the lens unit according to the present invention with reference to the accompanying drawings.

FIG. 1 is a section view showing a CCTV lens unit 10 to which the first embodiment for the attachment structure of the lens unit of the present invention is applied. In the lens unit 10, a first lens 14, an iris unit 16 and a second lens 18 are arranged along the optical axis P from the front of a casing 12. The lens unit 10 is attached to a camera body 24, which is shown with alternate long and two short dashes lines, via an interlock ring (interlock member) 20 and an attachment ring (attachment member) 22, which are provided at the rear (the right end part in FIG. 1) of the casing 12. A thread 22A is formed on an outer peripheral surface of the attachment ring 22.

The first lens 14 is mounted in a lens mount frame 26, which is substantially cylindrical and is fixed in the casing 12. In the same manner as the first lens 14, the second lens 18 is mounted in a lens mount frame 28, which is substantially cylindrical and is fixed to the rear part of the casing 12.

In FIG. 2, a helicoid thread 30 is formed on an outer peripheral surface of the lens mount frame 28, and a helicoid thread 34 which is formed on an inner peripheral surface of a focus ring 32 engages with the helicoid thread 30. When the focus ring 32 is rotated, the lens mount frames 28 and 26 move forward and backward along the optical axis P so that the focusing is performed. After the focusing, the focus ring 32 is fixed to the attachment ring 22 with a screw (not shown).

In FIG. 1, the iris unit 16 is arranged between the first lens 14 and the second lens 18. The iris unit 16 is driven by an iris meter 36 so as to adjust to a proper aperture value. The iris meter 36 is provided in a space between the lens mount frame 26 and the casing 12. A cable 38 of the iris meter 36 is arranged to outside from an opening (not shown) on the casing 12, and is connected with a connector 40 of the camera body 24, which is shown with alternate long and two short dashes lines in FIG. 1.

On the other hand, as shown in FIGS. 2 and 3, two keys 42 are formed to face one another on an inner peripheral surface of the interlock ring 20. The interlock ring 20 is attached to the lens mount frame 28 by engaging the keys 42 with key grooves 44 (the key groove of the bottom side are not shown) formed on the lens mount frame 28 shown in FIG. 2. The interlock ring 20 is pressed to the left in FIG. 2 by a plate spring 48 which is arranged between the interlock ring 20 and a stopper plate 46. Moreover, the interlock ring 20 is pressed to the right in FIG. 2 by a plate spring 52 which is arranged between the interlock ring 20 and a stopper plate 50 of the attachment ring 22. The force of the plate spring 52 is set to be stronger than the force of the plate spring 48.

FIG. 3 is a semi-section view of the interlock ring 20 and the attachment ring 22 taken along line 3—3 in FIG. 1.

Figure 4:
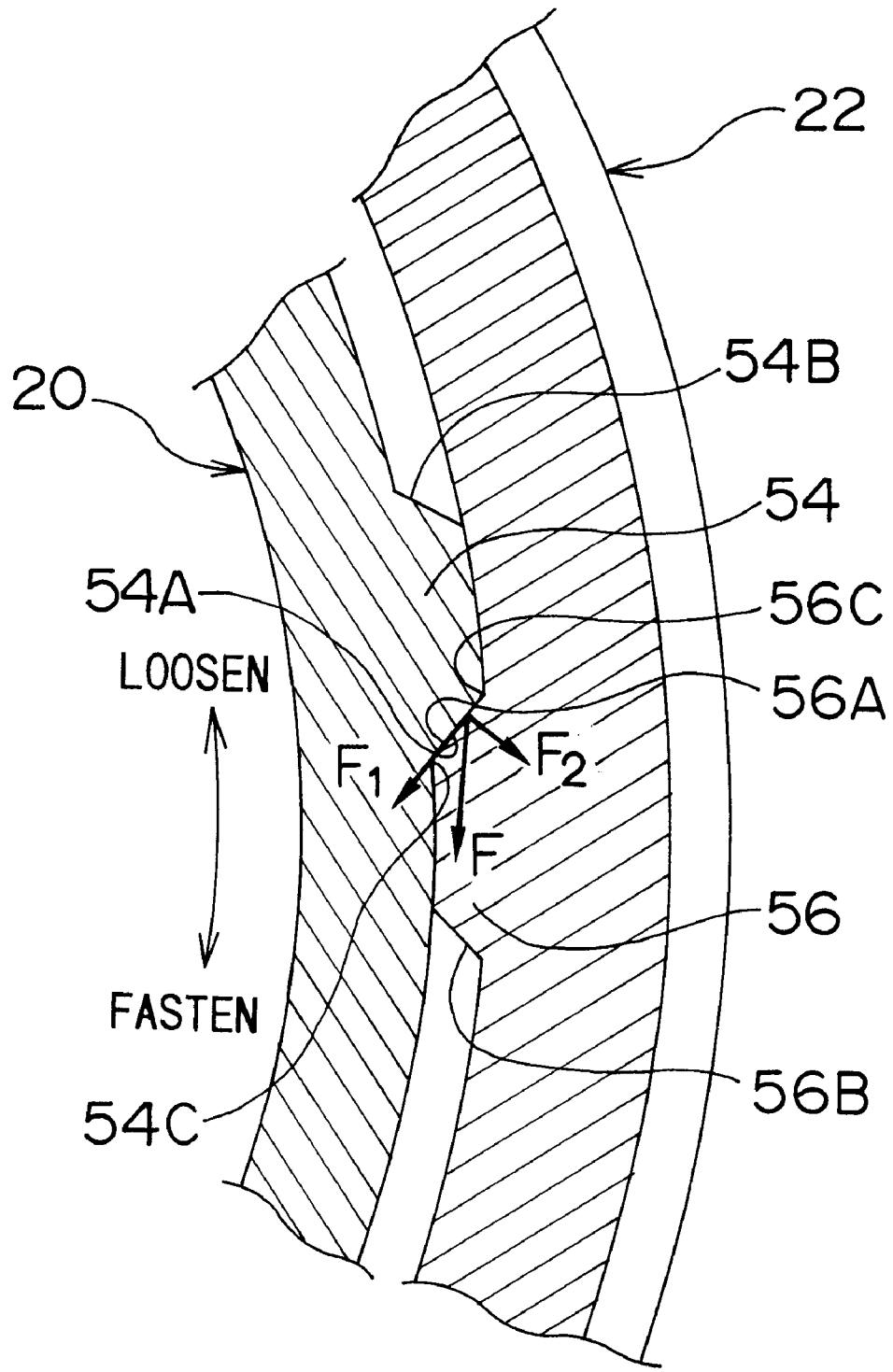
FIG. 4 is an enlarged section view of a part around projections shown in FIG. 3.

As shown in FIG. 3, a trapezoidal projection 54 is formed on an outer peripheral surface of the interlock ring 20. Both side faces 54A, 54B of the projection 54 are slant with respect to radial directions of the interlock ring 20 as shown in FIG. 4. A trapezoidal projection 56 is formed on an inner peripheral surface of the attachment ring 22. Both side faces 56A, 56B of the projection 56 are slant with respect to radial directions of the attachment ring 22 as shown in FIG. 4.

When the interlock ring 20 rotates in a fastening direction in FIGS. 3 and 4 with a rotation of the casing 12 (see FIG. 1) in the attaching direction, the slant face 54A of the projection 54 is pressed against the slant face 56A of the projection 56, so that the rotational force of the interlock ring 20 is transmitted to the attachment ring 22. Thereby, the attachment ring 22 is rotated in the fastening direction and is screwed into a lens mount part 24A, which is treaded, of the camera body 24 shown in FIG. 1.

In reverse, when the interlock ring 20 rotates in a loosening direction in FIGS. 3 and 4 with a rotation of the casing 12 in the detaching direction, the slant face 54B of the projection 54 is pressed against the slant face 56B of the projection 56, so that the attachment ring 22 rotates in the loosening direction along with the interlock ring 20. Thus, the lens unit 10 is detached from the camera body 24.

A description will hereunder be given about the operation of the attachment structure of the lens unit in the first embodiment, which is constructed in the above-mentioned manner.

First, in FIG. 1, the thread part 22A of the attachment ring 22 is fitted in the lens mount part 24A of the camera body 24. Then, the casing 12 is rotated in the attaching direction, and the rotational force of the casing 12 is transmitted to the interlock ring 20. Then, the interlock ring 20 and the attachment ring 22 are in the state that the slant face 54A of the projection 54 and the slant face 56A of the projection 56 are pressed against one another, so that the rotational force of the interlock ring 20 is transmitted to the attachment ring 22. Thereby, the attachment ring 22 is rotated and screwed into the lens mount part 24A, and thus the lens unit 10 is attached to the camera body 24.

On completion of the fastening of the attachment ring 22, if an excessive rotational force in the fastening direction is transmitted from the casing 12 to the attachment ring 22 via the interlock ring 20, the excessive rotational force F in the fastening direction is decomposed into a force $F_1$ which is parallel to the slant faces 54A and 56A of the projections 54 and 56 and a force $F_2$ which is perpendicular to the slant faces 54A and 56A as shown in FIG. 4. Thereby, the stress concentration does not occur at the base corners 54C and 56C of the projections 54 and 56. Thus, in this embodiment, the projections 54 and 56 can be prevented from breaking due to over-fastening although the projections 54 and 56 are smaller than the conventional projections in which vertical faces are pressed against one another.

On the other hand, to adjust the position of the cable 38 shown in FIG. 1 after fastening the attachment ring 22, the casing 12 may be rotated in the detaching direction by a proper amount. The rotational force of the casing 12 in the loosening direction is not transmitted to the attachment ring 22 until the slant face 54B of the projection 54 comes in contact with the slant face 56B of the projection 56. Since the projections 54 and 56 can be small, the rotational range of the casing 12 to adjust the position of the cable 38 can be wide.

As shown in FIG. 4, the excessive rotational force F is decomposed by the slant faces 54A and 56A of the projections 54 and 56 into the force $F_1$ which compresses the interlock ring 20 in the radial direction and the force $F_2$ which stretches the attachment ring 22 in the radial direction. In the first embodiment of the present invention, the projections 54 and 56 are formed at positions on the interlock ring 20 and the attachment ring 22 where the lens mount frame 28 is located inside and the lens mount part 24A of the camera body 24 is located outside. Thereby, the interlock ring 20 is prevented from warping by the lens mount frame 28, and the attachment ring 22 is prevented from warping by the lens mount part 24A of the camera body 24. Thus, the strength of the interlock ring 20 and the attachment ring 22 is improved by forming the projections 54 and 56 at the above-described positions, so that the interlock ring 20 and the attachment ring 22 can be much prevented from breaking due to over-fastening.

Figure 5:
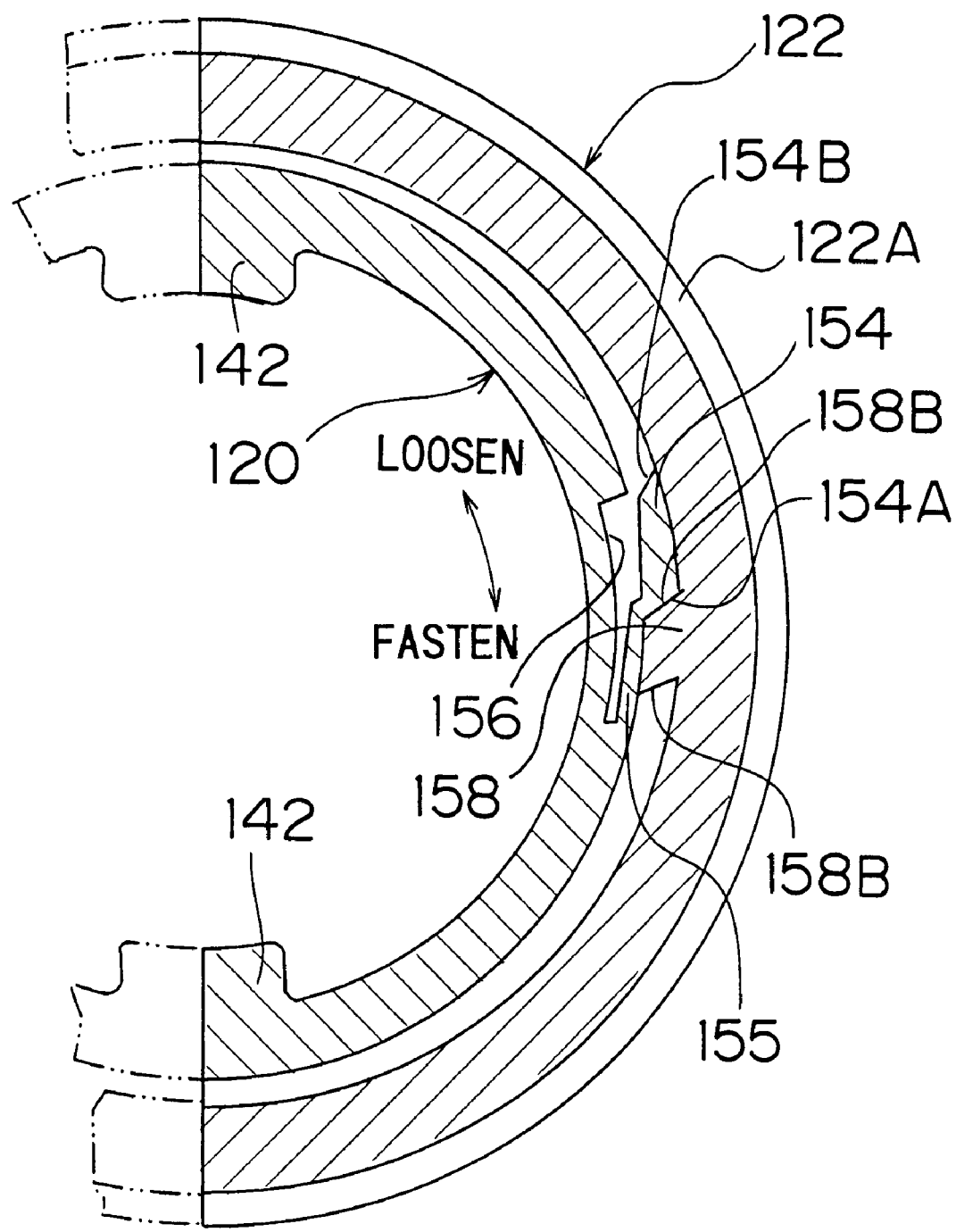
FIG. 5 is a semi-section view of an interlock ring and an attachment ring of the second embodiment.

FIG. 5 is a semi-section view of an interlock ring 120 and an attachment ring 122 in the second embodiment of the present invention.

Figure 6:
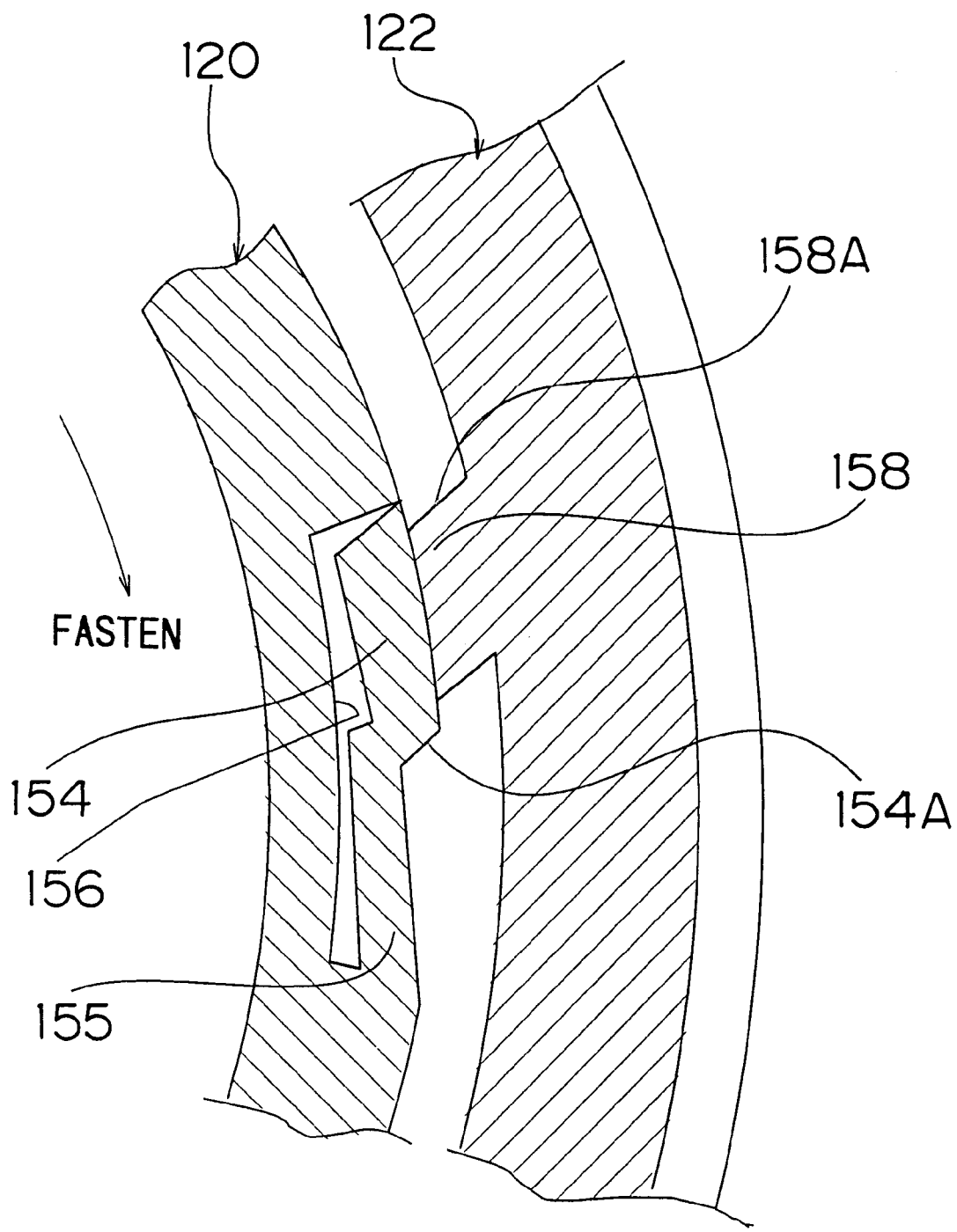
FIG. 6 is a section view showing the state that a tip piece of an arm of the interlock ring is pushed by a projection of the attachment ring so as to retract from an engaging state

As shown in FIG. 5, an arm 155 which has a tip piece 154 is formed at an outer periphery of the interlock ring 120. The arm 155 extends from a base end fixed on the interlock ring 120, and the tip piece 154 is elastically movable in a radial direction of the interlock ring 120. Slant faces 154A and 154B are formed at both ends of the tip piece 154. The slant faces 154A and 154B are parallel with one another. A recessed part 156 is formed on an outer peripheral surface of the interlock ring 120 so that the tip piece 154 can enter the recessed part 156. As shown in FIG. 6, the recessed part 156 has a depth enabling the whole of the tip piece 154 to enter the recessed part 156.

As shown in FIGS. 5 and 6, a projection 158 is formed on an inner peripheral surface of the attachment ring 122, and both side faces 158A, 158B of the projection 158 are slant. The slant faces 158A and 158B are parallel with one another. In FIG. 5, when the interlock ring 120 rotates in the fastening direction with a rotation of the casing 12 (see FIG. 1) in the attaching direction, the slant face 154A of the tip piece 154 is pressed against the slant face 158A of the projection 158, so that the rotational force of the interlock ring 120 is transmitted to the attachment ring 122. Thereby, the attachment ring 122 rotates in the fastening direction and a thread part 122A of the attachment ring 122 is screwed into the lens mount part 24A of the camera body 24 shown in FIG. 1.

Figure 7:
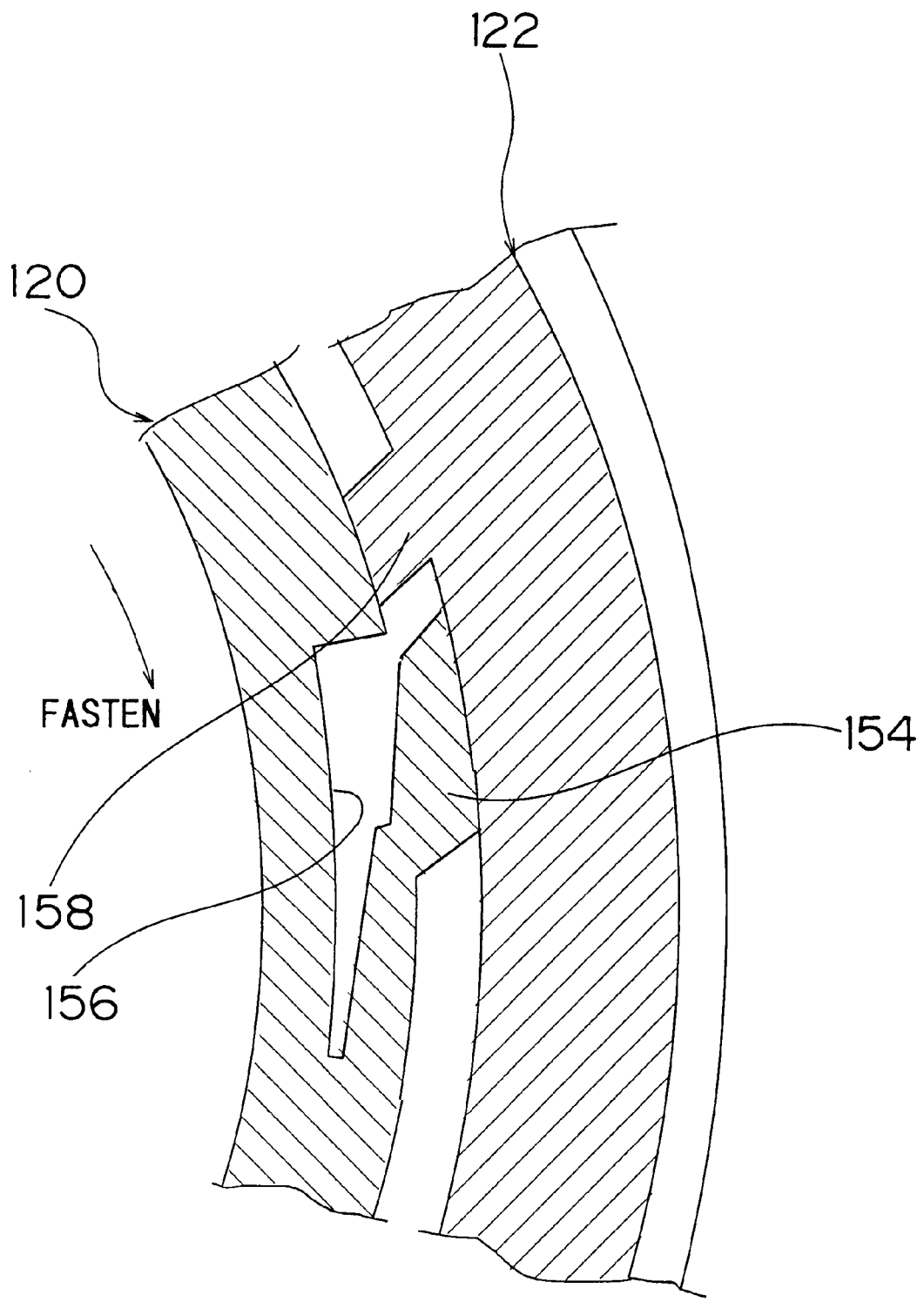
FIG. 7 is a section view showing the state that the tip piece passes by the projection of the attachment ring and returns to its original state.

On completion of the fastening of the attachment ring 122, if an excessive rotational force in the fastening direction is transmitted from the casing 12 to the attachment ring 122 via the interlock ring 120, the tip piece 154 is pushed into the recessed part 156 by the slant face 158A of the projection 158 as shown in FIG. 6. As shown in FIG. 7, when the tip piece 154 passes by the projection 158 in the fastening direction, the tip piece 154 returns to its original state (the state shown in FIG. 5) with restitution of the arm 155.

Figure 8:
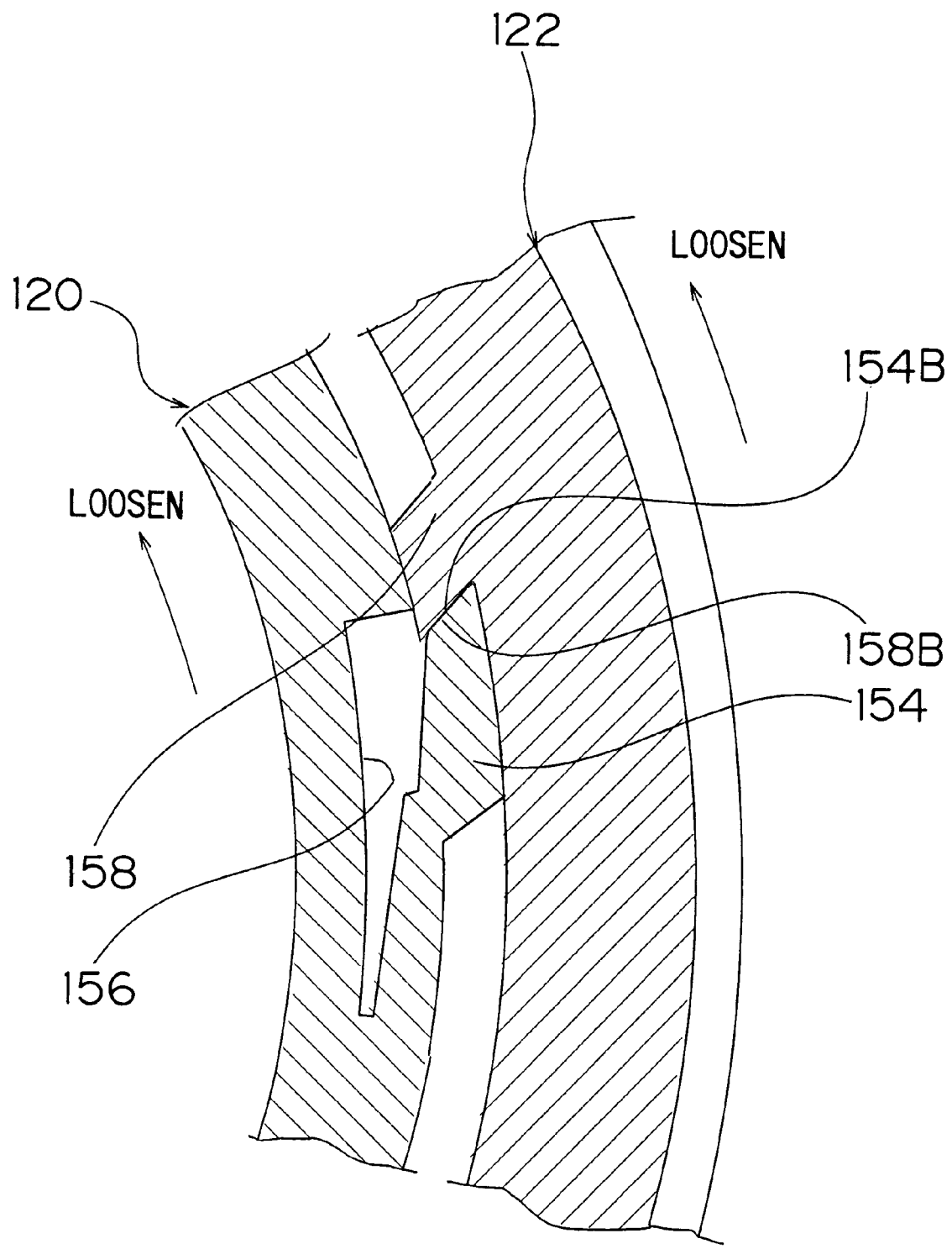
FIG. 8 is a section view showing the state that the tip piece engages with the projection of the attachment ring by the rotation of a casing in the loosening direction.

In reverse, when the interlock ring 120 rotates in the loosening direction with the rotation of the casing 12 in the detaching direction, the slant face 154B of the tip piece 154 is pressed against the slant face 158B of the projection 158 as shown in FIG. 8, so that the attachment ring 122 rotates in the loosening direction along with the interlock ring 120. Thus, the lens unit 10 is detached from the camera body 24.

A description will hereunder be given about the operation of the attachment structure of the lens unit in the second embodiment, which is constructed in the above-mentioned manner.

First, the threaded part 122A of the attachment ring 122 is fitted in the lens mount part 24A of the camera body 24. Then, the casing 12 is rotated in the attaching direction, and the rotational force of the casing 12 is transmitted to the interlock ring 120. Thereby, the interlock ring 120 and the attachment ring 122 are in the state that the slant face 154A of the tip piece 154 and the slant face 158A of the projection 158 are pressed against one another, so that the rotational force of the interlock ring 120 is transmitted to the attachment ring 122. Thus, the attachment ring 122 is rotated and screwed into the camera body 24.

On completion of the fastening of the attachment ring 122, if an excessive rotational force in the fastening direction is transmitted from the casing 12 to the attachment ring 122 via the interlock ring 120, the tip piece 154 is pressed hard against the slant face 158A of the projection 158. Thereby, the tip piece 154 retracts from the position where the slant face 154A is in contact with the slant face 158A of the projection 158 to the position where the tip piece 154 enters the recessed part 156 as shown in FIG. 6. Thus, according to this embodiment, the projections 154 and 158 can be prevented from breaking due to over-fastening.

On the other hand, to adjust the position of the cable 38 after fastening the attachment ring 122, the casing 12 may be rotated in the attaching direction. The rotational force of the casing 12 is not transmitted to the attachment ring 122 until the slant face 154A of the tip piece 154 comes in contact with the slant face 158A of the projection 158 again, thus the rotational range of the casing 12 to adjust the position of the cable 38 can be wide.

In reverse, when the casing 12 is rotated in the detaching direction and the interlock ring 120 rotates in the loosening direction in FIG. 5, the slant face 154B of the tip piece 154 is pressed against the slant face 158B of the projection 158. Thereby, the attachment ring 122 rotates in the loosening direction along with the interlock ring 120. Thus, the lens unit 10 can be easily detached from the camera body 24 in the second embodiment.

In the second embodiment of the present invention, the faces 154B, 158B of the projections 154, 158, which are pressed against one another with the rotation in the loosening direction, are slant; however, the present invention is not restricted to this. The faces 154B, 158B may face any direction as long as the rotational force of the interlock ring 120 in the loosening direction can be transmitted to the attachment ring 122. For example, the faces 154B, 158B may be parallel with the radial direction of the interlock ring 120.

Figure 9:
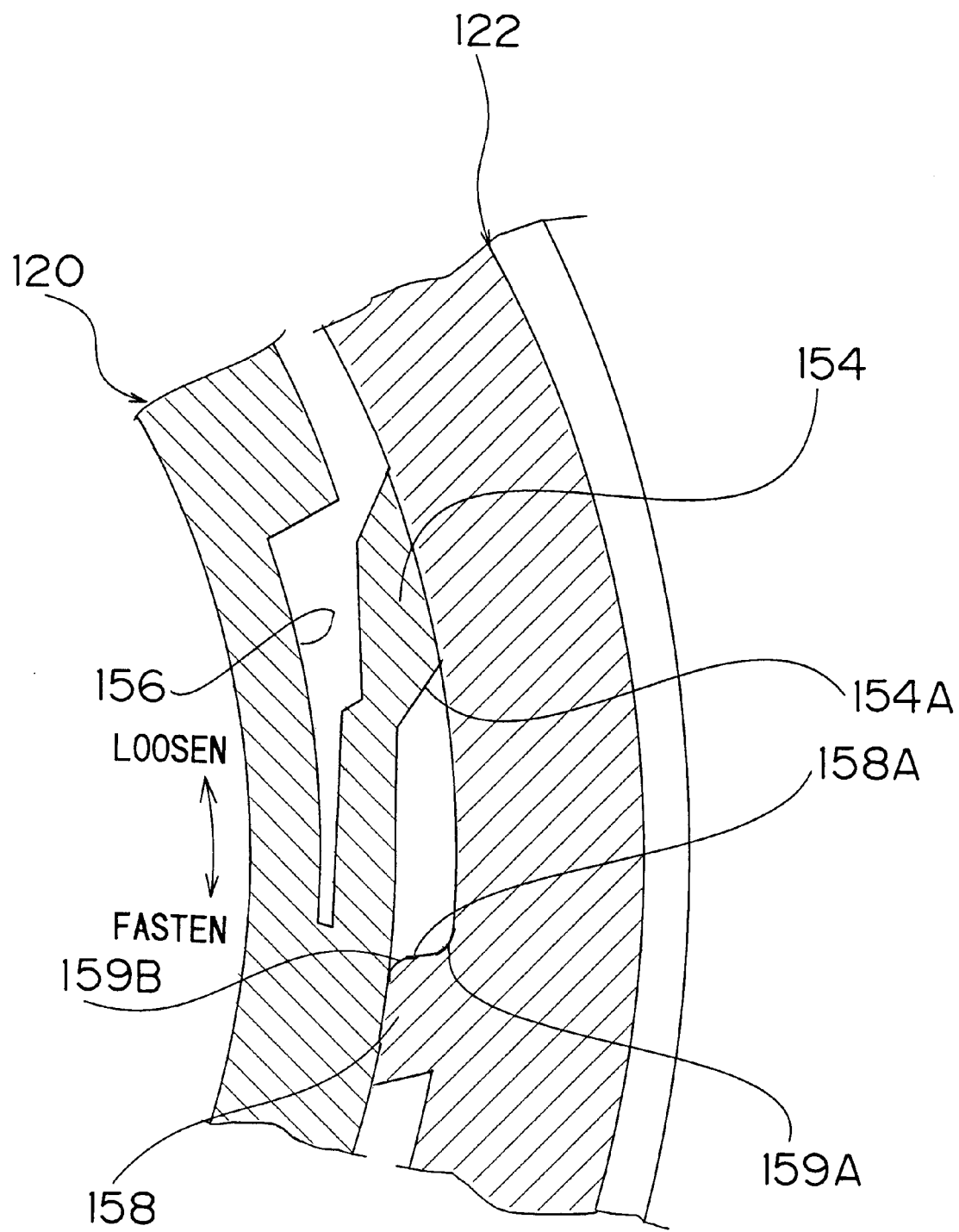
FIG. 9 is a section view illustrating a projection of an attachment ring of another embodiment in which corners of a slant face are rounded.

In the second embodiment of the present invention, the slant faces 154A, 156A of the projections 154, 156 have angles at corners; however, corners 159A, 159B of the slant face 158A of the projection 158 may be rounded as shown in FIG. 9. Thereby, the tip piece 154 can be easily pushed-in by the projection 158, and thus the projections 154 and 158 can be much prevented from breaking.

In the second embodiment of the present invention, the tip piece 154 is elastically supported; but the present invention is not restricted to this. Both projections 154 and 158 may be elastically supported, or only the projection 158 may be elastically supported.

In the embodiments of the present invention, the interlock ring is attached to the casing; but the present invention is not restricted to this. The casing and the interlock ring may be unitedly formed.

As described above, according to the attachment structure of the lens unit of the present invention, even if an excessive rotational force is transmitted from the casing to the attaching member via the interlock member on completion of fastening the attaching member, the projections can be prevented from breaking because the contact faces of the projections are slant. Moreover, the projections of the present invention can be small, so that the rotational range of the casing to adjust the position of the cable can be wide.

Further, according to the attachment structure of the lens unit of the present invention, even if an excessive rotational force is transmitted from the casing to the attaching member via the interlock member on completion of fastening the attaching member, the projections can be prevented from breaking because at least one of the projections, which is elastically supported, is pushed by the slant face of the other projection and retracts from the position in contact with the other projection.

Furthermore, to adjust the position of the cable, the casing may be rotated after fastening the attaching member. The rotational force of the casing is not transmitted to the attaching member, and the rotation range of the casing can be wide.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. An attachment structure for attaching a lens unit to a camera body comprising:

a casing of said lens unit holding a lens support member supporting a taking lens;

an attaching member with a threaded part for attaching said casing to the camera body by engaging to a threaded part of the camera body, said attaching member being provided with a projection having an axially extending face slanting with respect to a radial direction of said threaded part of said attaching member so as to be directed circumferentially and inward relative to said threaded part; and an interlock member for transmitting a rotational force of said casing to said attaching member, said interlock member being provided with a projection having an axially extending face slanting with respect to the radial direction of said threaded part of said attaching member so as to be directed circumferentially and outward relative to said threaded part, said face of said projection of said interlock member being in contact with said face of said projection of said attaching member when the rotational force is transmitted through said projections, said faces decomposing the rotational force into a force component which is parallel to the faces and a force component which is perpendicular to the faces for eliminating stress concentrations at base corners of the projections.

2. The attachment structure as described in claim 1, wherein said projections are provided at positions where said lens support member is located inside the inner one of said interlock member and said attaching member, and where said threaded part of the camera body is located outside of the outer one of said interlock member and said attaching member when said lens unit is attached to the camera body.

3. The attachment structure as described in claim 1, wherein at least one of said projections is elastically supported, so that, when an excessive rotational force is applied to said interlock member, the one projection can retract from a contact position where the face of the one projection is in contact with the face of the other projection.

4. The attachment structure as described in claim 1, wherein said lens support member supports an iris unit consisting of an iris and an iris meter.

5. The attachment structure as described in claim 1, wherein said casing has a cable for electrically connecting said lens unit to the camera body, and said casing is capable of rotating to adjust a position of said cable without rotating said attaching member.

6. An attachment structure for attaching a lens unit to a camera body comprising:

a casing of said lens unit, said casing being provided with a projection;

an attaching member with a threaded part for attaching said casing to the camera body by engaging to a threaded part of the camera body, said attaching member being provided with a projection having an axially extending face slanting with respect to a radial direction of said threaded part of said attaching member so as to be directed circumferentially and inward relative to said threaded part; and wherein said projection of said casing comes in contact with said face of said projection of said attaching member when said casing is rotated, so that a rotational force of said casing is transmitted to said attaching member through said projections, said face decomposing the rotational force into a force component which is parallel to the face and a force component which is perpendicular to the face for eliminating a stress concentration at a base corner of the projection of the attaching member.

7. The attachment structure as described in claim 6, wherein said casing has a cable for electrically connecting said lens unit to the camera body, and said casing is capable of rotating to adjust a position of said cable without rotating said attaching member.

8. An attachment structure for attaching a lens unit to a camera body comprising:

a casing of said lens unit holding a lens support member supporting a taking lens;

an attaching member with a threaded part for attaching said casing to the camera body by engaging to a threaded part of the camera body, said attaching member being provided with a projection having a slanting face; and an interlock member for transmitting a rotational force of said casing to said attaching member, said interlock member being provided with a projection having a slanting face, said face of said projection of said interlock member being in contact with said face of said projection of said attaching member when the rotational force is transmitted through said projections;

wherein at least one of said projections is elastically supported, so that, when an excessive rotational force is applied to said interlock member, the one projection can retract from a contact position where the face of the one projection is in contact with the face of the other projection.

9. The attachment structure as described in claim 8, wherein said casing has a cable for electrically connecting the lens unit to the camera body, and said casing is capable of rotating to adjust a position of said cable without rotating said attaching member.

10. An attachment structure for attaching a lens unit to a camera body comprising:

a casing of said lens unit, said casing being provided with a projection having a slanting face; and an attaching member with a threaded part for attaching said casing to the camera body by engaging to a threaded part of the camera body, said attaching member being provided with a projection having a slanting face;

wherein said projection of said casing comes in contact with said face of said projection of said attaching member when said casing is rotated, so that a rotational force of said casing is transmitted to said attaching member through said projections;

wherein at least one of said projections is elastically supported, so that, when an excessive rotational force is applied to said casing, the one projection can retract from a contact position where the face of the one projection is in contact with the face of the other projection.

11. The attachment structure as described in claim 10, wherein said casing has a cable for electrically connecting the lens unit to the camera body, and said casing is capable of rotating to adjust a position of said cable without rotating said attachment member.

* * * * *